United States Patent
Mizuguchi

(10) Patent No.: US 11,186,266 B2
(45) Date of Patent: Nov. 30, 2021

(54) VEHICLE CONTROLLER

(71) Applicant: AISIN SEIKI KABUSHIKI KAISHA, Kariya (JP)

(72) Inventor: Hirotaka Mizuguchi, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 298 days.

(21) Appl. No.: 16/248,870

(22) Filed: Jan. 16, 2019

(65) Prior Publication Data

US 2019/0232939 A1 Aug. 1, 2019

(30) Foreign Application Priority Data

Jan. 30, 2018 (JP) .............................. JP2018-013257

(51) Int. Cl.

| | |
|---|---|
| B60L 9/00 | (2019.01) |
| B60W 20/00 | (2016.01) |
| B60K 6/387 | (2007.10) |
| B60K 6/40 | (2007.10) |
| B60W 10/06 | (2006.01) |
| B60W 10/08 | (2006.01) |
| B60W 30/20 | (2006.01) |

(52) U.S. Cl.
CPC ............. *B60W 20/00* (2013.01); *B60K 6/387* (2013.01); *B60K 6/40* (2013.01); *B60W 10/06* (2013.01);
(Continued)

(58) Field of Classification Search
CPC ...... B60W 20/00; B60W 10/06; B60W 10/08; B60W 30/20; B60W 2030/206; B60W 2510/0291; B60W 2510/0676; B60W 2510/0685; B60W 2510/087; B60W 2710/0644; B60W 2710/0666; B60W 2710/083; B60W 10/10; B60W 10/11;
(Continued)

(56) References Cited

U.S. PATENT DOCUMENTS 7,228,209 B2 6/2007 Izawa et al.
9,566,984 B2 2/2017 Kuwamoto et al.
(Continued)

FOREIGN PATENT DOCUMENTS

| JP | 2005-16505 | 1/2005 | |
|---|---|---|---|
| JP | 2007276594 A | * 10/2007 | ............ B60W 20/00 |
| JP | 2014-213637 | 11/2014 | |

OTHER PUBLICATIONS

JP2007276594A.English.Translation, Vehicle Control Device (Year: 2007).*

*Primary Examiner* — B M M Hannan
(74) *Attorney, Agent, or Firm* — Oblon, McClelland, Maier & Neustadt, L.L.P.

(57) ABSTRACT

A vehicle controller is applied to a vehicle having an engine, a transmission, a clutch connecting and disconnecting a crankshaft of the engine and an input shaft of the transmission to each other, a vehicle wheel connected to a drive axle of the transmission, and an electric motor disposed to be capable of transmitting torque to the crankshaft The vehicle controller controls driving of the electric motor such that a rotation speed of the engine is reduced when an operation state of the engine shifts from operation to stop. The vehicle controller controls rotation of the crankshaft so as to avoid coincidence between a crank angle and a top dead center angle of the engine in a vibration amplification region amplifying an amplitude of vibration generated when the operation state of the engine shifts to the stop.

7 Claims, 9 Drawing Sheets

(52) U.S. Cl.
CPC ............ *B60W 10/08* (2013.01); *B60W 30/20* (2013.01); *B60W 2030/206* (2013.01); *B60W 2510/0291* (2013.01); *B60W 2510/0676* (2013.01); *B60W 2510/0685* (2013.01); *B60W 2510/087* (2013.01); *B60W 2710/0644* (2013.01); *B60W 2710/0666* (2013.01); *B60W 2710/083* (2013.01); *B60Y 2200/92* (2013.01); *B60Y 2300/192* (2013.01)

(58) Field of Classification Search
CPC ......... B60W 30/19; B60K 6/387; B60K 6/40; B60K 2006/4825; B60K 6/48; B60Y 2200/92; B60Y 2300/192; Y02T 10/62
USPC .......................................................... 701/22
See application file for complete search history.

(56) References Cited

U.S. PATENT DOCUMENTS

| | | | | |
|---|---|---|---|---|
| 2002/0062806 | A1* | 5/2002 | Suzuki | B60W 10/08 123/179.3 |
| 2007/0234990 | A1* | 10/2007 | Shiino | F02N 11/08 123/179.16 |
| 2009/0030595 | A1* | 1/2009 | Sugai | B60L 7/26 701/112 |
| 2009/0265075 | A1* | 10/2009 | Niimi | B60W 10/06 701/102 |
| 2010/0222949 | A1* | 9/2010 | Muta | B60W 10/06 701/22 |
| 2011/0251018 | A1* | 10/2011 | Kim | B60K 6/46 477/5 |
| 2012/0078456 | A1* | 3/2012 | Hakumura | B60W 30/188 701/22 |
| 2012/0323425 | A1* | 12/2012 | Suyama | B60W 10/02 701/22 |
| 2014/0330476 | A1* | 11/2014 | Tsukada | B60K 6/445 701/22 |
| 2016/0059863 | A1* | 3/2016 | Kuwamoto | B60W 30/20 701/22 |
| 2016/0114789 | A1* | 4/2016 | Kawai | B60W 10/06 701/22 |
| 2018/0009431 | A1* | 1/2018 | Akuzawa | B60W 10/06 |
| 2018/0087459 | A1* | 3/2018 | Hagari | G01L 3/04 |
| 2019/0210590 | A1* | 7/2019 | Hoshino | B60W 30/18127 |

* cited by examiner

VEHICLE CONTROLLER

CROSS REFERENCE TO RELATED APPLICATIONS

This application is based on and claims priority under 35 U.S.C. § 119 to Japanese Patent Application 2018-013257, filed on Jan. 30, 2018, the entire contents of which are incorporated herein by reference.

TECHNICAL FIELD

This disclosure relates to a vehicle controller damping vehicular vibration.

BACKGROUND DISCUSSION

A vehicle drive controller disclosed in, for example, the following JP 2005-16505A (Reference 1) is known in the related art. This vehicle drive controller according to the related art has engine target rotational speed acquisition processing means for acquiring an engine target rotational speed required for stopping an engine at a target stop position by reducing the rotational speed of the engine, crank angle acquisition processing means for acquiring a crank angle representing a crankshaft position, and engine target rotational speed correction processing means for correcting the engine target rotational speed based on the acquired crank angle. This vehicle drive controller according to the related art corrects the engine target rotational speed based on the crank angle, and a motor generates motor torque such that the corrected engine target rotational speed is reached. As a result, in this vehicle drive controller according to the related art, the engine is stopped at the target stop position with respect to a variation in the frictional force of the engine or an electric motor, a variation in the temperature or the viscosity of lubrication oil and cooling oil, or vehicle acceleration and deceleration during engine rotational speed reduction.

Also known according to the related art is a hybrid vehicle controller disclosed in, for example, the following JP 2014-213637A (Reference 2). In this controller according to the related art, a first electric motor generates torque in a direction to stop the rotation of an internal combustion engine when the rotation of the internal combustion engine is stopped in a hybrid vehicle including the first electric motor, a second electric motor, the internal combustion engine, and a torsional damper. This controller according to the related art adjusts the intensity of the generated torque such that no sharp change occurs in the generated torque that the first electric motor generates as the elastic energy accumulated in the torsional damper is released. In this controller according to the related art, the rotational speed of the internal combustion engine is sharply reduced by the first electric motor generating the generated torque.

In the vehicle drive controller disclosed in Reference 1, the motor torque generated by the motor is decided from the deviation between the engine target rotational speed and the actual rotational speed of the engine. Accordingly, the value of the motor torque may switch between positive and negative when, for example, a shift has occurred from a case where the actual rotational speed exceeds the engine target rotational speed to a case where the actual rotational speed exceeds the engine target rotational speed. In this case, the direction in which the motor torque acts switches. As a result, an abnormal sound such as a tooth striking sound may be generated between the gears that are provided on a powertrain for engine-to-vehicle wheel power transmission.

In a case where the operation state of an internal combustion engine (engine) shifts from operation to stop, that is, in a case where fuel injection is stopped and an engine piston compresses or expands only air in a cylinder, the air is most compressed at the top dead center of the engine. As a result, the compressed air becomes a vibration source vibrating the engine. In general, a vibration amplification region is found in an extremely low rotation range of an internal combustion engine (engine). Accordingly, the amplitude of the vibration is amplified by resonance in a case where the vibration of the internal combustion engine (engine) is not suppressed in the vibration amplification region. With the controller that is disclosed in Reference 2, it is possible to suppress vibrational amplification based on a quick passage through the vibration amplification region (resonance region) by means of the generated torque generated by the first electric motor. However, Reference 2 gives no consideration to suppressing the generation of internal combustion engine (engine) vibration in the vibration amplification region. As a result, a damping effect may not be sufficiently obtained.

Thus, a need exists for a vehicle controller which is not susceptible to the drawback mentioned above.

SUMMARY

A vehicle controller according to an aspect of this disclosure is applied to a vehicle having an engine, a transmission, a clutch connecting and disconnecting a crankshaft of the engine and an input shaft of the transmission to each other, a vehicle wheel connected to a drive axle of the transmission, and an electric motor disposed so as to be capable of transmitting torque to at least the crankshaft and controls driving of the electric motor such that a rotation speed of the engine is reduced when an operation state of the engine shifts from operation to stop. The vehicle controller is configured to control rotation of the crankshaft so as to avoid coincidence between a crank angle as a rotation angle of the crankshaft and a top dead center angle as a rotation angle corresponding to a top dead center of the engine in a vibration amplification region amplifying an amplitude of vibration generated when the operation state of the engine shifts to the stop.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
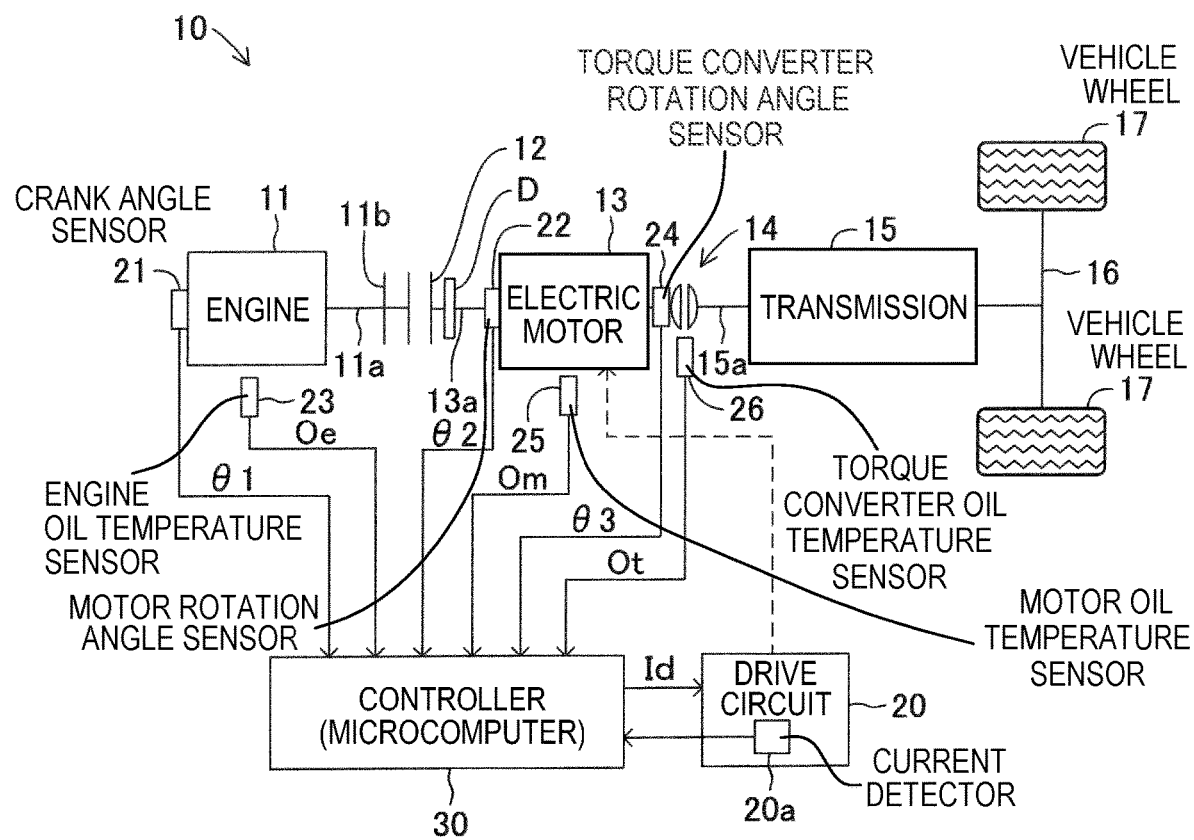
FIG. 1 is a block diagram schematically illustrating the configuration of a vehicle of an embodiment.

Hereinafter, an embodiment disclosed here (hereinafter, also referred to as "the present embodiment") will be described with reference to accompanying drawings. Note that the same or equivalent parts are denoted by the same reference numerals in the following embodiment and modification examples. Each drawing used for the description is a conceptual diagram, and the shape of each part is not necessarily strict in some cases.

As illustrated in FIG. 1, a vehicle 10 of the present embodiment is provided with an engine 11 as a drive source, a clutch 12, a damper D, an electric motor 13, a torque converter 14, a transmission 15, a drive axle 16, and vehicle wheels 17. A controller 30 is applied to the vehicle 10. The engine 11 is a multi-cylinder internal combustion engine that has a plurality of cylinders and a plurality of pistons and generates power (engine torque) by using gasoline, light oil, or the like as a fuel. The engine 11 is provided with a crankshaft 11a as an output shaft outputting the engine torque. The crankshaft 11a is provided with a flywheel 11b and is connected to the clutch 12.

The clutch 12, which is a multiplate wet clutch or the like, transmits the engine torque of the engine 11 to the transmission 15 via the electric motor 13 and the torque converter 14 by frictional engagement and transmits the motor torque of the electric motor 13 to the engine 11. Also, the clutch 12 releases connection between the engine 11 and the electric motor 13 by the frictional engagement being released. As a result, the engine torque of the engine 11 is transmitted to the electric motor 13 and the motor torque of the electric motor 13 can be transmitted to the engine 11 in a case where the clutch 12 is frictionally engaged and the engine torque of the engine 11 is not transmitted to the electric motor 13 and the motor torque of the electric motor 13 is not transmitted to the engine 11 in a case where the clutch 12 is not frictionally engaged.

The damper D, which is a torsion damper or the like, has an inner periphery connected to a motor shaft 13a of the electric motor 13. The damper D is provided with an outer plate (not illustrated) rotating integrally with the clutch 12 (that is, the crankshaft 11a), an inner plate (not illustrated) rotating integrally with the motor shaft 13a, a thrust member (not illustrated) fixed to the inner plate and sliding with respect to the outer plate, and a plurality of compression coil springs (not illustrated) disposed at equal intervals in the circumferential direction so as to connect the outer plate and the inner plate.

The damper D allows the inner plate to rotate relative to the outer plate when the clutch 12 is frictionally engaged (that is, when the engine torque is transmitted in a connected state). As a result, the damper D allows relative rotation of the motor shaft 13a with respect to the crankshaft 11a by generating torsional deformation.

The controller 30 (described later) performs drive control on the electric motor 13. The electric motor 13 according to the present embodiment has a rotor (not illustrated) immersed in working oil in a motor housing (not illustrated). The electric motor 13 is disposed so as to be capable of transmitting torque between the damper D and the torque converter 14 and upstream of the transmission 15 in the torque transmission direction in which the engine torque from the engine 11 is transmitted. One end side of the motor shaft 13a of the electric motor 13 as an output shaft outputting the motor torque is directly connected to the damper D and the other end side of the motor shaft 13a is directly connected to a pump impeller (not illustrated), which is the input side of the torque converter 14.

As a result, the electric motor 13 transmits the motor torque with respect to the crankshaft 11a (engine 11) and the torque converter 14 (that is, the transmission 15) in a case where the clutch 12 is frictionally engaged via the motor shaft 13a and transmits the motor torque with respect to the torque converter 14 (that is, the transmission 15) in a case where the clutch 12 is not frictionally engaged. The electric motor 13 is connected to the controller 30 via a drive circuit 20.

The torque converter 14 is disposed upstream of the transmission 15 in the torque transmission direction. In the torque converter 14, the motor shaft 13a of the electric motor 13 is directly connected to the pump impeller (not illustrated) on the input side and an input shaft 15a of the transmission 15 is directly connected to a turbine runner (not illustrated) on the output side.

The transmission 15 has the input shaft 15a and the drive axle 16. The transmission 15 is a known stepped transmission (such as an automatic transmission and a manual transmission) that has a plurality of (such as six) forward gear stages, one reverse gear stage, and a neutral stage. The gear stage of the transmission 15 is switched in response to an operation of, for example, a shift select lever (not illustrated). Specifically, the gear stage of the transmission 15 is formed as a result of a change in reduction ratio (ratio of the rotation speed of the input shaft 15a to the rotation speed of the drive axle 16). Note that the transmission 15 is an automatic transmission connected to the torque converter 14 in the present embodiment.

In the vehicle 10, the transmission 15 outputs, from the drive axle 16, at least one of the engine torque and the motor torque input via the input shaft 15a. The drive axle 16 transmits at least one of the engine torque and the motor torque to the vehicle wheels 17 via a differential (not illustrated) or the like. Note that the crankshaft 11a, the clutch 12, the damper D, the motor shaft 13a, the input shaft 15a, the transmission 15, and the drive axle 16 transmitting the power (engine torque) of the engine 11 and the power (motor torque) of the electric motor 13 to the vehicle wheels 17 are collectively referred to as a "powertrain" in the following description.

The vehicle 10 is provided with a crank angle sensor 21, a motor rotation angle sensor 22, an engine oil temperature sensor 23, a torque converter rotation angle sensor 24, a motor oil temperature sensor 25, and a torque converter oil temperature sensor 26.

The crank angle sensor 21 is provided on the crankshaft 11a of the engine 11. The crank angle sensor 21 detects a crank angle θ1 representing the rotation angle of the crankshaft 11a and outputs the crank angle θ1 to the controller 30.

Here, as will be described later, the controller 30 calculates a rotation speed Ne of the engine 11 based on a time change in the crank angle θ1. The motor rotation angle sensor 22 is provided on the electric motor 13 (more specifically, the motor shaft 13a). The motor rotation angle sensor 22 detects a motor rotation angle θ2 representing the rotation angle of the electric motor 13 and outputs the motor rotation angle θ2 to the controller 30. The engine oil temperature sensor 23 is provided in the engine 11. The engine oil temperature sensor 23 detects an oil temperature Oe of the engine oil that is charged into the engine 11, circulates inside the engine 11, and performs lubrication and cooling and outputs the oil temperature Oe to the controller 30.

The torque converter rotation angle sensor 24 is provided in the torque converter 14. The torque converter rotation angle sensor 24 detects a turbine angle θ3 representing the rotation angle of the torque converter 14 (specifically, the turbine runner) and outputs the turbine angle θ3 to the controller 30. The motor oil temperature sensor 25 is provided in the electric motor 13. The motor oil temperature sensor 25 detects an oil temperature Om of the working oil that is charged into the motor housing and performs lubrication and cooling and outputs the oil temperature Om to the controller 30. The torque converter oil temperature sensor 26 is provided in the torque converter. The torque converter oil temperature sensor 26 detects an oil temperature Ot of the working oil that is charged into the housing of the torque converter 14 and outputs the oil temperature Ot to the controller 30.

The controller 30 mounted in the vehicle 10 has a microcomputer including a CPU, a ROM, a RAM, an input-output interface, a timer, and the like as a main component of the controller 30. The controller 30 performs drive control on the electric motor 13 via the drive circuit 20 based on the detected values that are detected by the respective sensors 21 to 26.

In a case where the engine 11 is a four-cycle engine, combustion occurs once in a specific cylinder while the crankshaft 11a rotates twice. Accordingly, in a case where the engine 11 has four cylinders, combustion occurs in any one of the cylinders while the crankshaft 11a rotates by 180°, specifically, at the top dead center (TDC) at which the crank angle θ1 of the crankshaft 11a becomes 90° or 270°. Then, a force to push down the piston results from the combustion in the cylinder, and this force is converted into the engine torque that rotates the crankshaft 11a. Accordingly, the engine torque generated by the engine 11 fluctuates with the period of 180° rotation of the crankshaft 11a as a cycle, and the engine torque is maximized after the elapse of a predetermined period from the combustion-occurring top dead center of 90° or 270° in the case of four cylinders.

In a case where the operation state of the engine 11 shifts from operation to stop, the engine 11 stops fuel injection. In this case, compression and expansion of the air in the cylinder by the piston are alternately repeated. Here, the air in the cylinder is compressed and the pressure in the cylinder increases while the crankshaft 11a rotates by 180° in a state where the engine 11 has stopped fuel injection, specifically, when a top dead center angle θt is approached that corresponds to the top dead center at which the crank angle θ1 of the crankshaft 11a becomes 90° or 270°. In the situation in which the pressure in the cylinder increases, the compressed air serves as a vibration source, and vibration generated in the engine 11 is transmitted to the powertrain.

Figure 2:
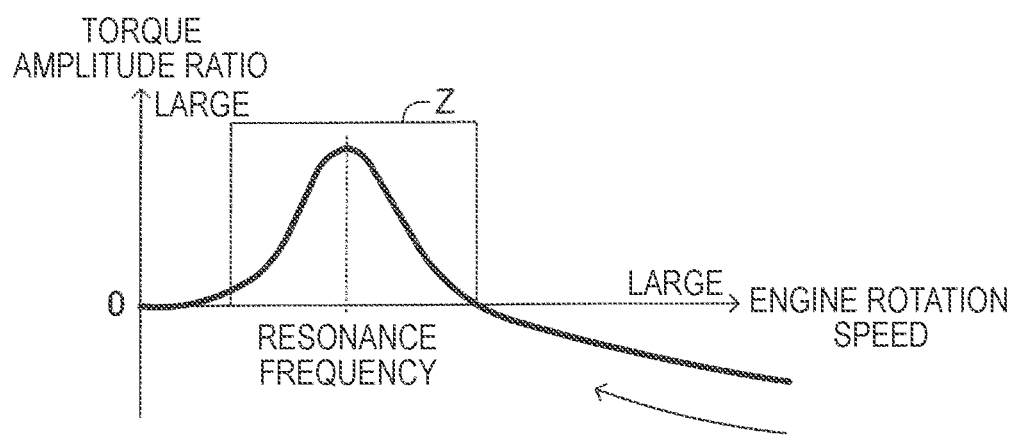
FIG. 2 is a diagram illustrating an increase in amplitude in a vibration amplification region.

As illustrated in FIG. 2, in the torsional vibration system of the powertrain having the damper D, the damper D undergoes torsional deformation and causes torsional vibration at or below a predetermined rotation speed Ne0 (such as approximately 400 rpm) in a case where the rotation speed Ne of the engine 11 decreases toward zero. Here, the predetermined rotation speed Ne0 is calculated in advance based on, for example, the inertia of the engine 11, the inertia of the electric motor 13, and the rigidity of the damper D.

Figure 3:
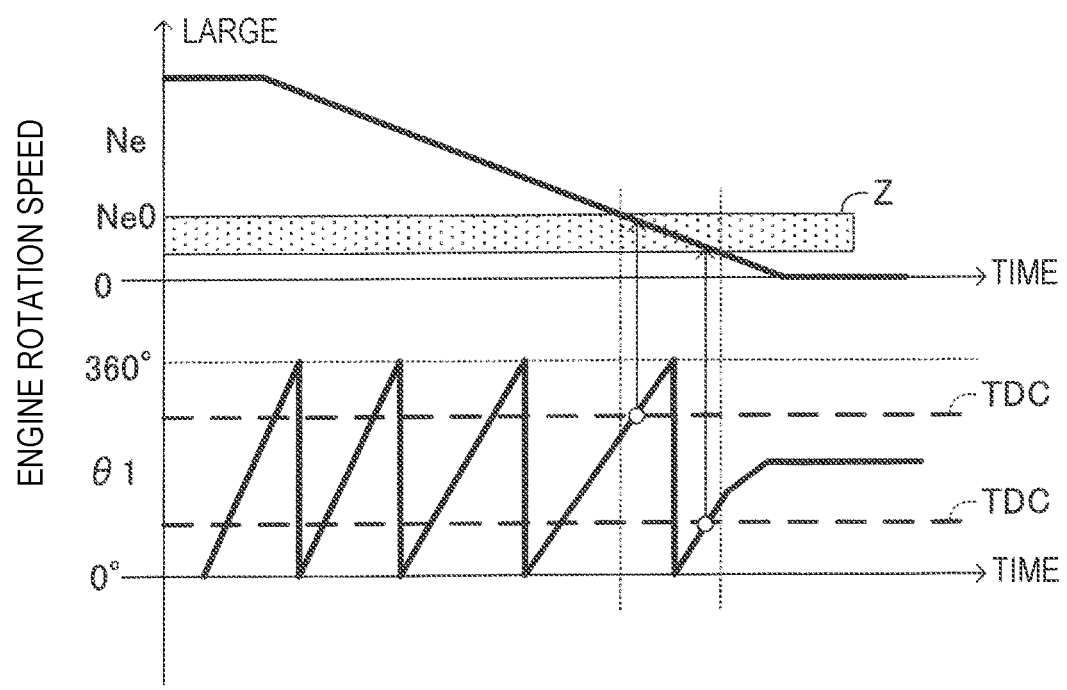
FIG. 3 is a diagram illustrating the relationship between an engine rotation speed and a top dead center in the vibration amplification region.

This gives rise to a vibration amplification region Z, in which the torque amplitude ratio representing the ratio of the output torque output to the transmission 15 to the input torque input to the engine 11 increases and torsional vibration deteriorates. As illustrated in FIG. 3, in this case, torsional vibration and vibration attributable to the air compressed as described above cause resonance and the amplitude of vibration in the powertrain is amplified in a case where the rotation speed Ne of the engine 11 is in the vibration amplification region Z and the crank angle θ1 coincides with the top dead center angle Ot.

In this regard, the controller 30 controls the rotation of the crankshaft 11a such that the crank angle θ1 as the rotation angle of the crankshaft 11a does not coincide with the top dead center angle θt as a rotation angle corresponding to the top dead center of the engine 11 in the vibration amplification region Z that amplifies the amplitude of the vibration generated when the operation state of the engine 11 shifts to stop in the powertrain transmitting the engine torque as the power of the engine 11 to the vehicle wheels 17. Specifically, in the present embodiment, the controller 30 executes damping control so as to damp the vibration generated when the engine 11 is stopped by driving the electric motor 13 connected to the crankshaft 11a via the clutch 12.

Figure 4:
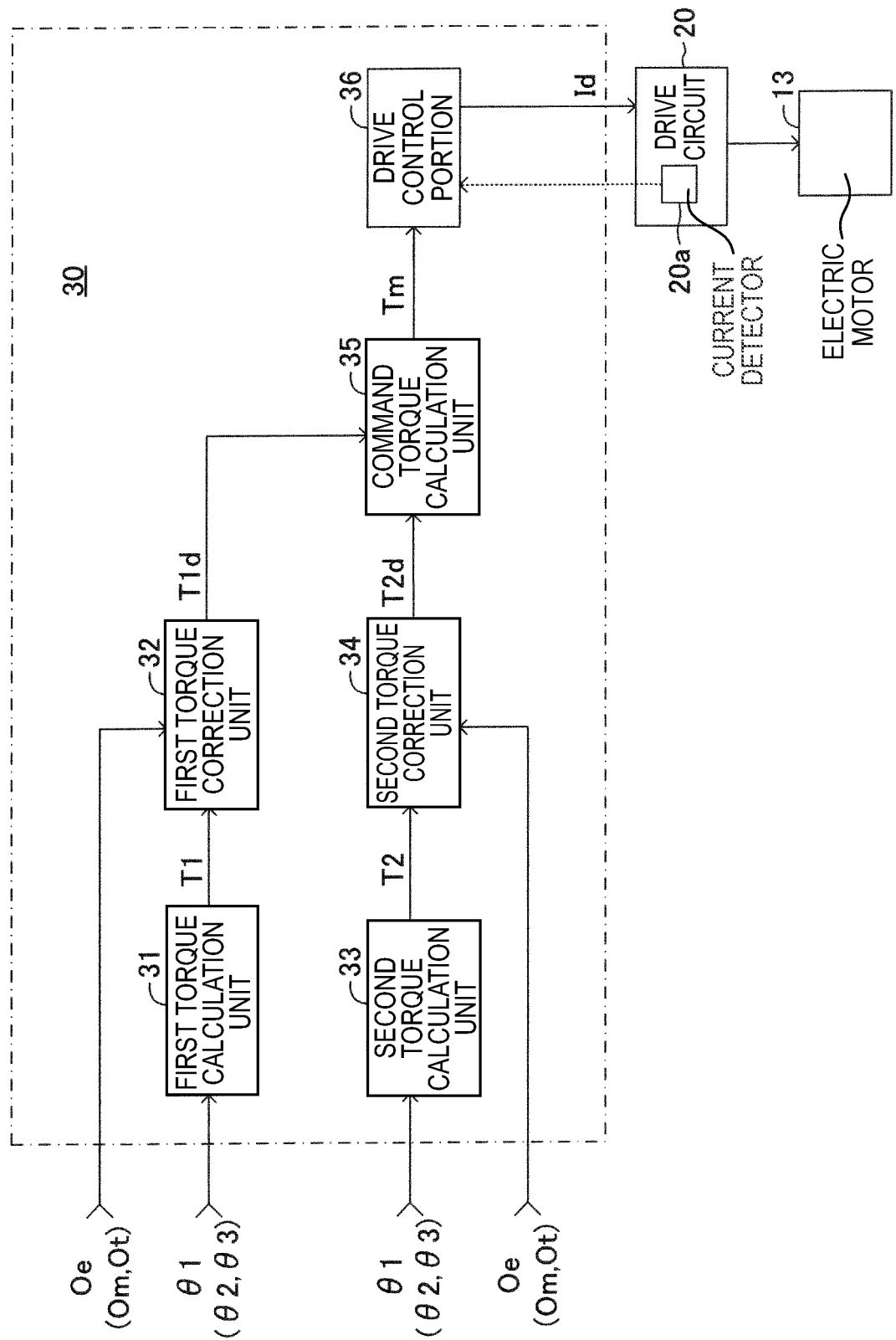
FIG. 4 is a functional block diagram schematically illustrating the configuration of a controller in FIG. 1.

In order to execute the damping control, the controller 30 has a first torque calculation unit 31, a first torque correction unit 32, a second torque calculation unit 33, a second torque correction unit 34, a command torque calculation unit 35, and a drive control portion 36 as illustrated in FIG. 4. Here, in the present embodiment, the electric motor 13 is disposed upstream of the transmission 15 and downstream of the clutch 12 and the damper D in the torque transmission direction. Accordingly, the frictional engagement of the clutch 12 is maintained until the engine 11 is stopped so that the motor torque from the electric motor 13 is transmitted to the crankshaft 11a of the engine 11 during the damping control.

The first torque calculation unit 31 calculates a first torque T1 that acts to reduce the rotation speed Ne of the engine 11 in a case where engine stop control is executed so that the operation state of the engine 11 is shifted from operation to stop. Specifically, with the crank angle θ1 of the crankshaft 11a input from the crank angle sensor 21, the first torque calculation unit 31 calculates the rotation speed Ne of the engine 11 based on a time change in the input crank angle θ1. Note that, in a case where the calculated rotation speed Ne of the engine 11 includes a fluctuation component, the first torque calculation unit 31 removes the fluctuation component by performing known filtering processing on the calculated rotation speed Ne.

Figure 5:
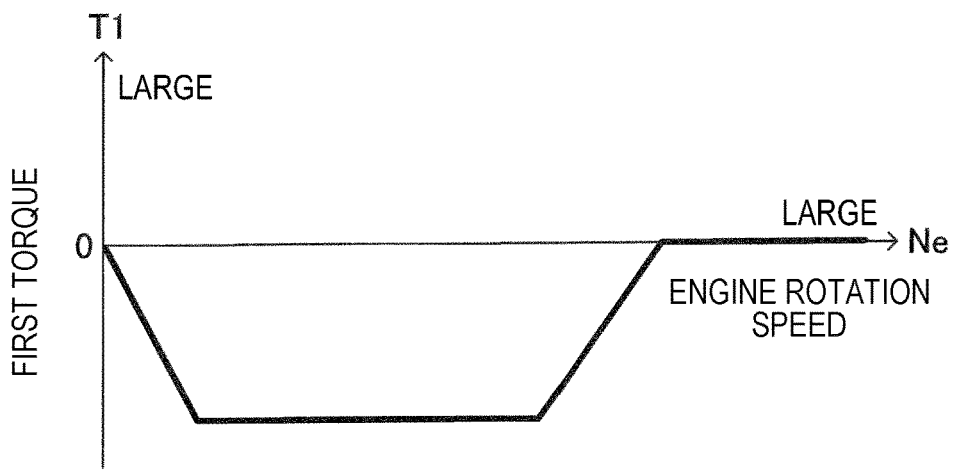
FIG. 5 is a graph illustrating the relationship between the engine rotation speed and a first torque.

As illustrated in FIG. 5, the first torque calculation unit 31 refers to a torque map indicating the relationship between the rotation speed Ne of the engine 11 and the first torque T1 in calculating the first torque T1 corresponding to the calculated rotation speed Ne of the engine 11. Here, in a case where the operation state of the engine 11 has shifted to stop, the absolute value of the first torque T1 increases as the rotation speed Ne decreases and decreases to zero as the rotation speed Ne becomes zero. The first torque calculation unit 31 outputs the calculated first torque T1 to the first torque correction unit 32.

Figure 6:
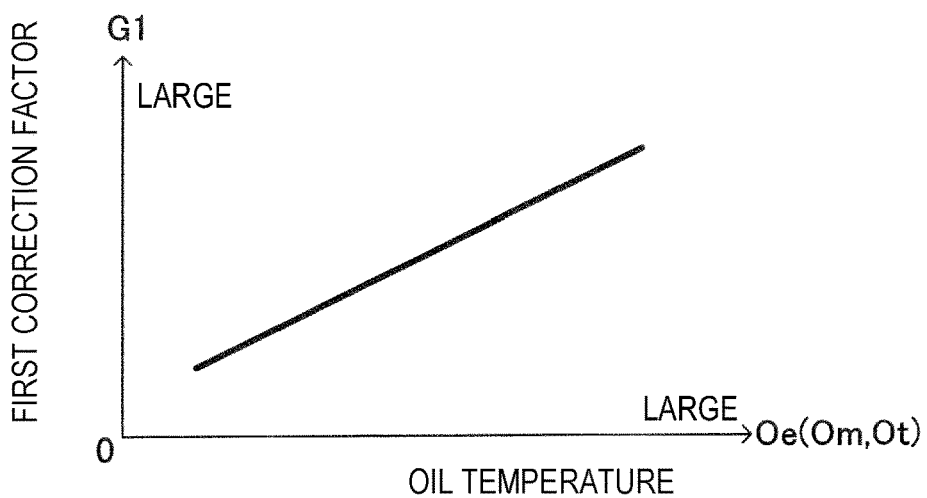
FIG. 6 is a graph illustrating the relationship between an oil temperature and a first correction factor.

As illustrated in FIG. 4, the first torque correction unit 32 calculates a post-correction first torque T1$d$ by correcting the first torque T1 calculated by the first torque calculation unit 31 based on a parameter related to reducing the rotation speed Ne of the engine 11. In the present embodiment, the parameter is the oil temperature Oe of the engine 11 input from the engine oil temperature sensor 23. Specifically, the oil temperature Oe of the engine oil charged into the engine 11 is input from the engine oil temperature sensor 23 to the first torque correction unit 32. Then, by referring to the oil temperature-first correction factor map that is illustrated in FIG. 6, the first torque correction unit 32 decides a first correction factor G1 by using the input oil temperature Oe. The value of the first correction factor G1 decreases as the oil temperature Oe decreases and increases as the oil temperature Oe increases. Here, as the oil temperature Oe decreases, the engine oil charged into the engine 11 increases in viscosity, and then the torque (viscous torque) that acts to reduce the rotation speed Ne of the engine 11 increases. Meanwhile, the viscosity decreases and the viscous torque decreases as the oil temperature Oe increases. Accordingly, the lower the oil temperature Oe as a parameter is, the more the oil temperature Oe contributes to reducing the rotation speed Ne of the engine 11, and the higher the oil temperature Oe is, the less the oil temperature Oe contributes to reducing the rotation speed Ne of the engine 11.

After deciding the first correction factor G1 based on the oil temperature Oe, the first torque correction unit 32 calculates the post-correction first torque T1$d$ by multiplying the first torque T1 calculated by the first torque calculation unit 31 by the first correction factor G1. In other words, the first torque correction unit 32 performs correction based on the oil temperature Oe, which is a parameter related to reducing the rotation speed Ne of the engine 11, and calculates the post-correction first torque T1$d$, during which the correction is performed such that the first torque T1 is smaller in a case where the oil temperature Oe contributes to reducing the rotation speed Ne of the engine 11 than in a case where the oil temperature Oe does not contribute to the reduction, specifically, in a case where the oil temperature Oe is low than in a case where the oil temperature Oe is high. The first torque correction unit 32 outputs the calculated post-correction first torque T1$d$ to the command torque calculation unit 35.

As illustrated in FIG. 3, the second torque calculation unit 33 calculates a second torque T2 that acts to delay the timing at which the crank angle θ1 coincides with the top dead center angle θt in the vibration amplification region Z. Specifically, with the crank angle θ1 of the crankshaft 11$a$ input from the crank angle sensor 21, the second torque calculation unit 33 calculates the rotation speed Ne of the engine 11 based on a time change in the input crank angle θ1. Note that, in a case where the calculated rotation speed Ne of the engine 11 includes a fluctuation component, the first torque calculation unit 31 removes the fluctuation component by performing known filtering processing on the calculated rotation speed Ne.

Figure 7:
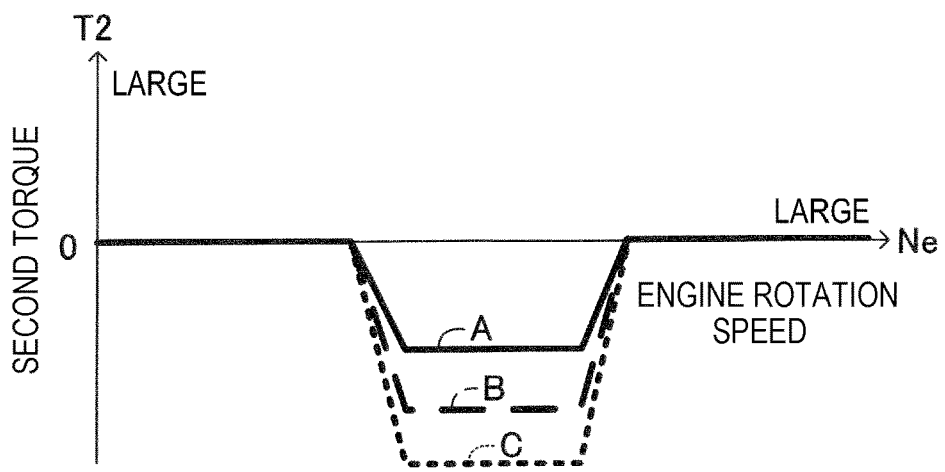
FIG. 7 is a graph illustrating the relationship between the engine rotation speed, a crank angle, and a second torque.

As illustrated in FIG. 7, the second torque calculation unit 33 refers to a torque map indicating the relationship between the rotation speed Ne of the engine 11 and the second torque T2 in calculating the second torque T2 corresponding to the calculated rotation speed Ne of the engine 11. Also, when the crank angle θ1 input from the crank angle sensor 21 changes toward the top dead center angle θt, the second torque calculation unit 33 changes the absolute value of the second torque T2 in accordance with the magnitude of the difference between the crank angle θ1 and the top dead center angle θt. Specifically, the second torque calculation unit 33 calculates the second torque T2 such that the absolute value of the second torque T2 increases in the order of A, B, and C that is illustrated in FIG. 7 as the difference decreases, that is, as the crank angle θ1 approaches the top dead center angle θt.

As a result, in a case where the crank angle θ1 is close to the top dead center angle θt, the calculated absolute value of the second torque T2 is large. As described later, in this case, the rotation of the crankshaft 11$a$ is braked and controlled by the electric motor 13 generating the second torque T2. Accordingly, it is possible to delay the timing at which the crank angle θ1 coincides with the top dead center angle θt in a case where the rotation speed Ne of the engine 11 is in the vibration amplification region Z. The second torque calculation unit 33 outputs the calculated second torque T2 to the second torque correction unit 34.

Figure 8:
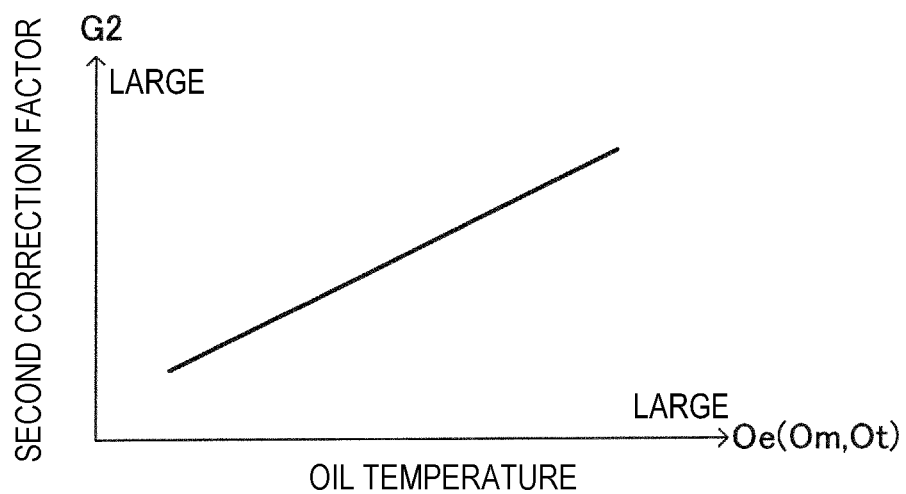
FIG. 8 is a graph illustrating the relationship between the oil temperature and a second correction factor.

As illustrated in FIG. 4, the second torque correction unit 34 calculates a post-correction second torque T2$d$ by correcting the second torque T2 calculated by the second torque calculation unit 33 based on a parameter related to reducing the rotation speed Ne of the engine 11. In the present embodiment, the parameter is the oil temperature Oe of the engine 11 input from the engine oil temperature sensor 23. Specifically, the oil temperature Oe of the engine oil charged into the engine 11 is input from the engine oil temperature sensor 23 to the second torque correction unit 34 as in the case of the first torque correction unit 32. Then, by referring to the oil temperature-second correction factor map that is illustrated in FIG. 8, the second torque correction unit 34 decides a second correction factor G2 by using the input oil temperature Oe. The value of the second correction factor G2 decreases as the oil temperature Oe decreases and increases as the oil temperature Oe increases.

After deciding the second correction factor G2 based on the oil temperature Oe, the second torque correction unit 34 calculates the post-correction second torque T2$d$ by multiplying the second torque T2 calculated by the second torque calculation unit 33 by the second correction factor G2. In other words, the second torque correction unit 34 performs correction based on the oil temperature Oe as a parameter and calculates the post-correction second torque T2$d$, during which the correction is performed such that the second torque T2 is smaller in a case where the oil temperature Oe contributes to delaying coincidence between the crank angle θ1 and the top dead center angle θt than in a case where the oil temperature Oe does not delay the coincidence, specifically, in a case where the oil temperature Oe is low than in a case where the oil temperature Oe is high. The second torque correction unit 34 outputs the calculated post-correction second torque T2$d$ to the command torque calculation unit 35.

As illustrated in FIG. 4, the post-correction first torque T1$d$ is input from the first torque correction unit 32 to the command torque calculation unit 35 and the post-correction second torque T2$d$ is input from the second torque correction unit 34 to the command torque calculation unit 35. Then, the command torque calculation unit 35 calculates a damping control torque command Tm for damping the vibration that is generated in the engine 11 when the engine 11 shifts to stop by adding the post-correction first torque T1$d$ to the post-correction second torque T2$d$. The command torque calculation unit 35 outputs the calculated damping control torque command Tm to the drive control portion 36.

Figure 9:
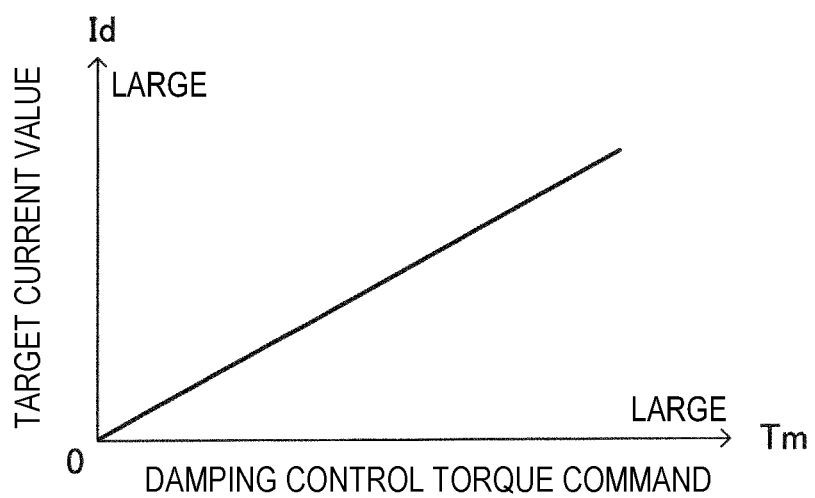
FIG. 9 is a graph illustrating the relationship between a damping control torque command and a target current value.

As illustrated in FIG. 4, the drive control portion 36 decides a target current value Id to be supplied to the electric motor 13 by using the damping control torque command Tm input from the command torque calculation unit 35 and referring to the damping control torque command-target current value map that is illustrated in FIG. 9. The target current value Id is decided so as to be "0" in a case where the damping control torque command Tm is "0" and increase as the damping control torque command Tm increases.

The drive control portion 36 controls the drive circuit 20 based on the decided target current value Id. In this case, the drive control portion 36 performs feedback input of the current value that flows to the electric motor 13 from a current detector 20a provided in the drive circuit 20 and controls the drive circuit 20 such that the current of the target current value Id flows to the electric motor 13. As a result, the electric motor 13 outputs a damping control torque Tv corresponding to the damping control torque command Tm to the crankshaft 11a via the motor shaft 13a. Note that the drive control portion 36 is capable of driving the electric motor 13 such that traveling torque is generated in addition to the damping control torque Tv corresponding to the damping control torque command Tm in a case where the electric motor 13 is driven so that the vehicle 10 travels with the traveling torque decided that responds to, for example, an operation of an accelerator pedal (not illustrated).

Figure 10:
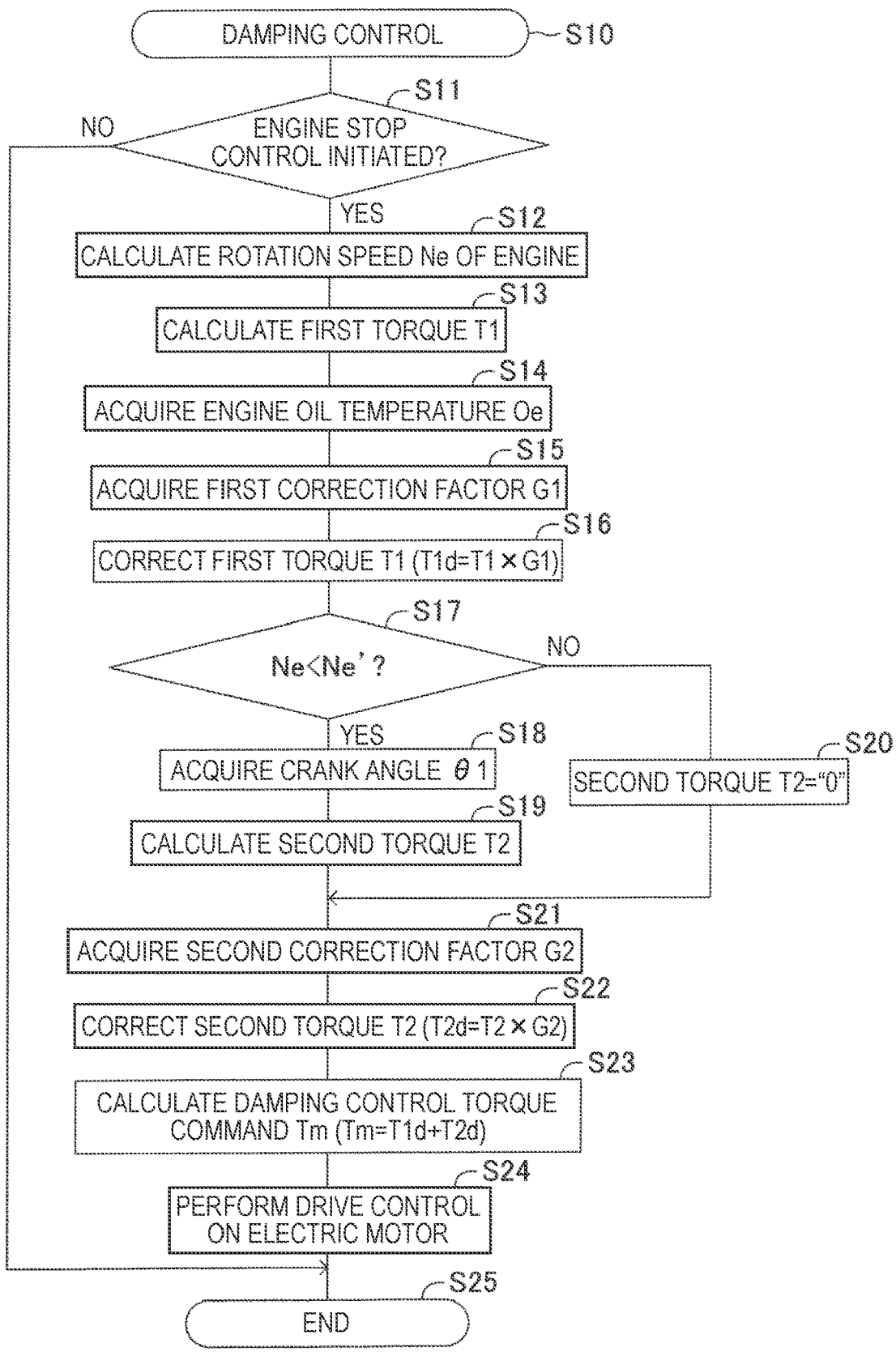
FIG. 10 is a flowchart of a damping control program executed by the controller.

Here, the operation of the controller 30 described above will be described with reference to the flowchart of the "damping control program" that is illustrated in FIG. 10. The "damping control program" is executed by the CPU constituting the controller 30 (microcomputer). Note that the "damping control program" is stored in advance in the ROM constituting the controller 30 (microcomputer). The controller 30 repeatedly initiates the execution of the "damping control program" in Step S10 each time a predetermined short time elapses.

Upon initiating the execution of the "damping control program" in Step S10, the controller 30 (more specifically, the CPU, the same applies below) determines in Step S11 whether or not the engine stop control for shifting the operation state of the engine 11 from operation to stop has been initiated by an engine controller (not illustrated). In other words, the controller 30 makes a "Yes" determination and proceeds to Step S12 when the engine stop control has been initiated. The controller 30 makes a "No" determination and proceeds to Step S25 when the engine stop control has not been initiated, and then the controller 30 temporarily terminates the execution of the "damping control program".

In Step S12, the controller 30 (first torque calculation unit 31) calculates the rotation speed Ne of the engine 11 with the crank angle θ1 of the crankshaft 11a input from the crank angle sensor 21. In other words, the controller 30 (first torque calculation unit 31) calculates the rotation speed Ne of the engine 11 based on a time change in the crank angle θ1 acquired (input) during the current execution of the "damping control program" with respect to a crank angle θ1' acquired (input) during the previous execution of the "damping control program". Then, the controller 30 (first torque calculation unit 31) proceeds to Step S13 after the calculation of the rotation speed Ne of the engine 11.

In Step S13, the controller 30 (first torque calculation unit 31) calculates the first torque T1. In other words, the controller 30 (first torque calculation unit 31) calculates the first torque T1 by referring to the torque map that is illustrated in FIG. 5 and using the rotation speed Ne of the engine 11 calculated in Step S12. The controller 30 proceeds to Step S14 after the calculation of the first torque T1.

In Step S14, the controller 30 (first torque correction unit 32) acquires the oil temperature Oe of the engine 11 from the engine oil temperature sensor 23 (the oil temperature Oe is input to the controller 30 (first torque correction unit 32)). Then, the controller 30 proceeds to Step S15 after the acquisition (input) of the oil temperature Oe.

In Step S15, the controller 30 (first torque correction unit 32) acquires (calculates) the first correction factor G1 by using the oil temperature Oe acquired (input) in Step S14 and referring to the oil temperature-first correction factor map that is illustrated in FIG. 6. The controller 30 proceeds to Step S16 after the acquisition (calculation) of the first correction factor G1.

In Step S16, the controller 30 (first torque correction unit 32) corrects the first torque T1 by multiplying the first torque T1 calculated in Step S13 by the first correction factor G1 acquired (calculated) in Step S15 and calculates the post-correction first torque T1d. The controller 30 proceeds to Step S17 after the calculation of the post-correction first torque T1d.

In Step S17, the controller 30 compares the rotation speed Ne of the engine 11 calculated in Step S12 with a determination rotation speed Ne', which is set to a rotation speed exceeding the rotation speed Ne0 on the upper limit side of the vibration amplification region Z, and determines whether or not the determination rotation speed Ne' exceeds the rotation speed Ne. In other words, the controller 30 makes a "Yes" determination and proceeds to Step S18, so that the crank angle θ1 does not coincide with the top dead center angle θt in the vibration amplification region Z, when the determination rotation speed Ne' exceeds the rotation speed Ne of the engine 11. When the rotation speed Ne of the engine 11 is equal to or higher than the determination rotation speed Ne', the controller 30 makes a "No" determination and proceeds to Step S20.

In Step S18, the controller 30 (second torque calculation unit 33) acquires the crank angle θ1 of the crankshaft 11a from the crank angle sensor 21 (the crank angle θ1 is input to the controller 30 (second torque calculation unit 33)). Here, the controller 30 (second torque calculation unit 33) calculates the rotation speed Ne of the engine 11 based on a time change in the crank angle θ1 acquired (input) during the current execution of the "damping control program" with respect to the crank angle θ1' acquired (input) during the previous execution of the "damping control program". Then, the controller 30 proceeds to Step S19 after the acquisition (input) of the crank angle θ1.

In Step S19, the controller 30 (second torque calculation unit 33) calculates the second torque T2. In other words, the controller 30 (second torque calculation unit 33) calculates the second torque T2 by referring to the torque map that is illustrated in FIG. 7 and using the calculated rotation speed Ne of the engine 11 and the crank angle θ1 acquired (input) in Step S18. In this case, the controller 30 (second torque calculation unit 33) decides the torque map of A, B, or C that is illustrated in FIG. 7 in accordance with the difference between the top dead center angle θt and the acquired (input) crank angle θ1 and calculates the second torque T2 corresponding to the rotation speed Ne. The controller 30 proceeds to Step S21 after the calculation of the second torque T2.

The controller 30 (second torque calculation unit 33) proceeds to Step S20 in the case of a "No" determination in the determination processing in Step S17. In Step S20, the controller 30 (second torque calculation unit 33) decides the second torque T2 to be zero as the rotation speed Ne of the engine 11 is still divergent from the vibration amplification region Z. In other words, in a situation in which Step S20 is executed, the electric motor 13 does not generate the second torque T2 for avoiding coincidence between the crank angle θ1 and the top dead center angle θt. The controller 30 proceeds to Step S21 after deciding the second torque T2 to be zero.

In Step S21, the controller 30 (second torque correction unit 34) acquires the oil temperature Oe of the engine 11 from the engine oil temperature sensor 23 (the oil temperature Oe is input to the controller 30 (second torque correction unit 34)), and then the controller 30 (second torque correction unit 34) refers to the oil temperature-second correction factor map that is illustrated in FIG. 8 by using the acquired (input) oil temperature Oe. Then, the controller 30 (second torque correction unit 34) acquires (calculates) the second correction factor G2. The controller 30 proceeds to Step S22 after the acquisition (calculation) of the second correction factor G2.

In Step S22, the controller 30 (second torque correction unit 34) corrects the second torque T2 by multiplying the second torque T2 calculated in Step S19 or Step S20 by the second correction factor G2 acquired (calculated) in Step S21 and calculates the post-correction second torque T2$d$. The controller 30 proceeds to Step S23 after the calculation of the post-correction second torque T2$d$.

In Step S23, the controller 30 (command torque calculation unit 35) calculates the damping control torque command Tm by adding the post-correction first torque T1$d$ calculated in Step S16 to the post-correction second torque T2$d$ calculated in Step S22. Then, the controller 30 proceeds to Step S24 after the calculation of the damping control torque command Tm.

In Step S24, the controller 30 (drive control portion 36) performs drive control on the electric motor 13 in accordance with the damping control torque command Tm calculated in Step S23. In other words, the controller 30 decides the target current value Id to be supplied to the electric motor 13 by using the calculated damping control torque command Tm and referring to the damping control torque command-target current value map that is illustrated in FIG. 9.

Then, the controller 30 performs feedback input of the current value that flows to the electric motor 13 from the current detector 20*a* of the drive circuit 20 and controls the drive circuit 20 such that the current of the target current value Id flows to the electric motor 13. As a result, the electric motor 13 outputs (transmits) the damping control torque Tv corresponding to the damping control torque command Tm with respect to the crankshaft 11*a*.

The controller 30 proceeds to Step S25 after the drive control on the electric motor 13 in Step S24. Then, the controller 30 temporarily terminates the execution of the "damping control program" in Step S25. Subsequently, the controller 30 re-initiates the execution of the "damping control program" in Step S10 after the elapse of a predetermined short time.

Figure 11:
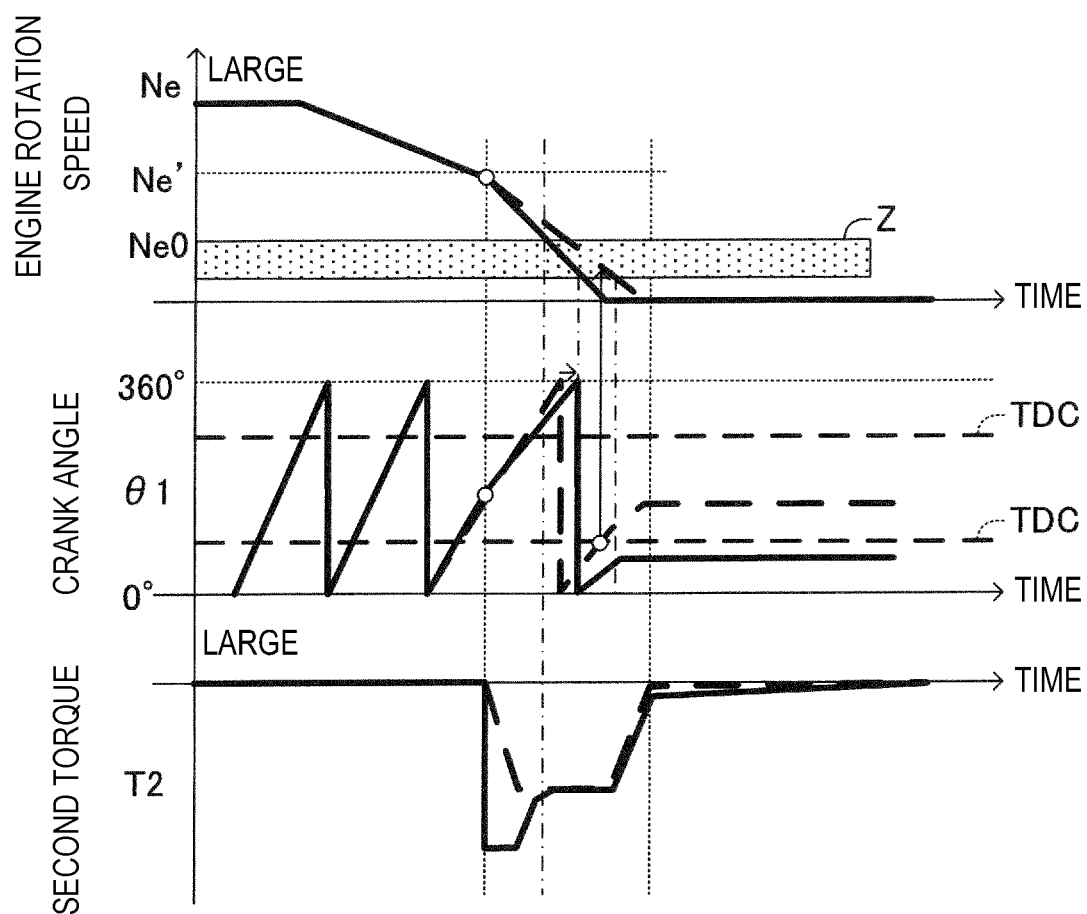
FIG. 11 is a diagram illustrating time changes in the engine rotation speed, the crank angle, and the second torque (post-correction second torque) in the case of the damping control program execution.

As illustrated in FIG. 11, in a case where the "damping control program" is executed by the controller 30 as described above, the electric motor 13 first outputs the post-correction first torque T1$d$ to the crankshaft 11*a* as the damping control torque Tv as the operation state of the engine 11 shifts from operation to stop as a result of the engine stop control. As a result, the rotation speed Ne of the engine 11 promptly decreases.

Once the rotation speed Ne of the engine 11 dips below the determination rotation speed Ne', the electric motor 13 outputs the post-correction first torque T1$d$ and the post-correction second torque T2$d$ to the crankshaft 11*a* as the damping control torque Tv. As a result, the rotation speed Ne of the engine 11 increases in terms of reduction speed as indicated by the solid line in FIG. 11 as compared with a case where only the post-correction first torque T1$d$ is given as indicated by the dashed line in FIG. 11. In this case, as the reduction speed Ne of the rotation speed Ne of the engine 11 increases, the crank angle θ1 of the crankshaft 11*a* decreases in terms of the rate of change as compared with a case where only the post-correction first torque T1$d$ is given. As a result, the decreasing rotation speed Ne of the engine 11 promptly passes through the vibration amplification region Z and the crank angle θ1 slowly approaches the top dead center angle θt, and thus it is possible to avoid coincidence between the crank angle θ1 and the top dead center angle θt in the vibration amplification region Z. In other words, it is possible to delay (shift) the timing of coincidence.

Figure 12:
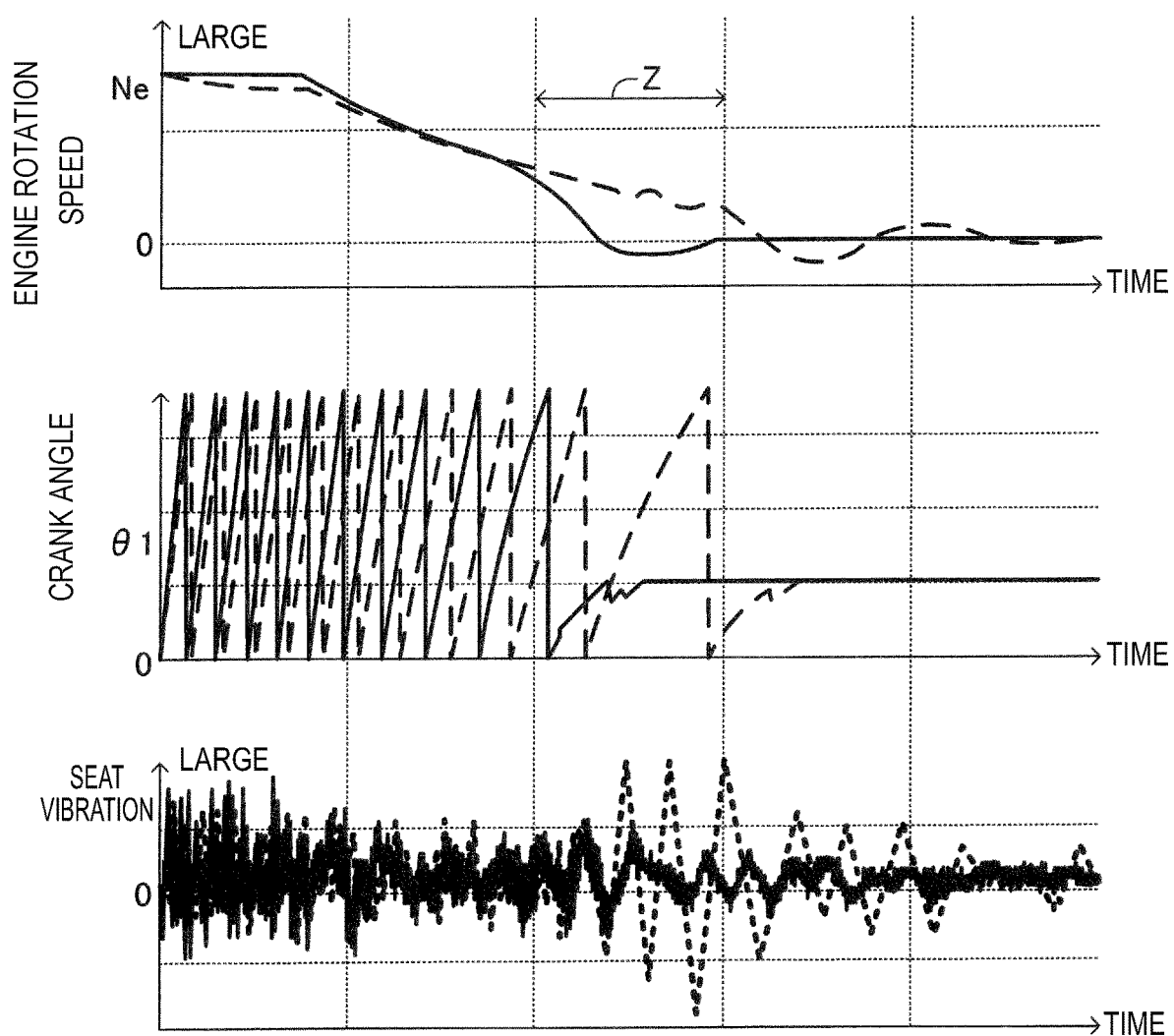
FIG. 12 is a diagram illustrating a damping effect in the case of the damping control program execution.

As described above, with the post-correction second torque T2$d$ output to the crankshaft 11*a*, the rotation speed Ne of the engine 11 is reduced for a prompt passage through the vibration amplification region Z and coincidence between the crank angle θ1 and the top dead center angle θt is avoided. As a result, the amplitude of seat vibration in the vibration amplification region Z can be reduced as illustrated in FIG. 12. In other words, it is possible to suppress an increase in vibration amplitude resulting from stopping of the engine 11, and damping can be performed in a satisfactory manner. Note that the solid line in FIG. 12 indicates a case where the post-correction second torque T2$d$ is output to the crankshaft 11*a* and the dashed line in FIG. 12 indicates a case where the post-correction second torque T2$d$ is not output to the crankshaft 11*a*.

As can be understood from the above description, the vehicle controller 30 according to the above embodiment is applied to the vehicle 10 that has the engine 11, the transmission 15, the clutch 12 for connection and disconnection between the crankshaft 11*a* of the engine 11 and the input shaft 15*a* of the transmission 15, the vehicle wheels 17 connected to the drive axle 16 of the transmission 15, and the electric motor 13 disposed between the engine 11 and the transmission 15 so as to be capable of transmitting torque to at least the crankshaft 11*a*.

The controller 30 is a vehicle controller that controls driving of the electric motor 13 so as to reduce the rotation speed Ne of the engine 11 when the operation state of the engine 11 shifts from operation to stop. The controller 30 is configured to control the rotation of the crankshaft 11*a* such that the crank angle θ1 as the rotation angle of the crankshaft 11*a* does not coincide with the top dead center angle θt as a rotation angle corresponding to the top dead center of the engine 11 in the vibration amplification region Z that amplifies the amplitude of the vibration generated when the operation state of the engine 11 shifts to stop.

According to this, the controller 30 is capable of controlling the rotation of the crankshaft 11*a* such that the crank angle θ1 of the crankshaft 11*a* does not coincide with the top dead center angle θt corresponding to the top dead center of the engine 11 in the vibration amplification region Z. Accordingly, the vibration of the engine 11 can be suppressed in the vibration amplification region Z, and a satisfactory damping effect can be obtained.

In this case, the controller 30 is provided with the first torque calculation unit 31, the first torque correction unit 32, the second torque calculation unit 33, the second torque correction unit 34, the command torque calculation unit 35, and the drive control portion 36. The first torque calculation unit 31 calculates the first torque T1 that reduces the rotation speed Ne of the engine 11. The first torque correction unit 32 performs correction based on a parameter related to reducing the rotation speed Ne of the engine 11 and calculates the post-correction first torque T1$d$, during which the correction is performed such that the first torque T1 is smaller in a case where the parameter contributes to reducing the rotation speed Ne of the engine 11 than in a case where the parameter does not contribute to the reduction. The second torque calculation unit 33 calculates the second torque T2 that delays the timing at which the crank angle θ1 coincides with the top dead center angle θt. The second torque correction unit 34 performs correction based on a parameter and calculates the post-correction second torque T2d, during which the correction is performed such that the second torque T2 is smaller in a case where the parameter contributes to delaying coincidence between the crank angle θ1 and the top dead center angle θt than in a case where the parameter does not delay the coincidence. The command torque calculation unit 35 calculates the damping control torque command Tm for damping the vibration that is generated in the engine 11 when the engine 11 shifts to stop by adding the post-correction first torque T1d to the post-correction second torque T2d. The drive control portion 36 performs drive control on the electric motor 13 based on the damping control torque command Tm and generates the damping control torque Tv such that the damping control torque Tv is transmitted to the engine 11 via the crankshaft 11a.

According to this, the controller 30 is capable of generating the damping control torque Tv in the electric motor 13 and transmitting the damping control torque Tv to the crankshaft 11a by adding the first torque T1 (post-correction first torque T1d) for reducing the rotation speed Ne of the engine 11 for a prompt passage through the vibration amplification region Z to the second torque T2 (post-correction second torque T2d) for avoiding coincidence between the crank angle θ1 and the top dead center angle θt in the vibration amplification region Z. Accordingly, it is possible to more appropriately suppress the vibration of the engine 11 in the vibration amplification region Z, and a satisfactory damping effect can be obtained.

In this case, the second torque calculation unit 33 calculates the second torque T2 such that the second torque T2 increases as the difference between the crank angle θ1 and the top dead center angle θt decreases and decreases as the difference increases.

According to this, the rotation of the crankshaft 11a can be braked with the second torque T2 acting on the crankshaft 11a increasing as the difference between the crank angle θ1 and the top dead center angle θt decreases. As a result, the crank angle θ1 can be slowly changed toward the top dead center angle θt in the vibration amplification region Z, and coincidence between the crank angle θ1 and the top dead center angle θt can be avoided in a satisfactory manner. Accordingly, a satisfactory damping effect can be obtained.

In this case, the transmission 15 is connected to the engine 11 and the electric motor 13 via the torque converter 14 provided on the input shaft 15a, and the parameter is the oil temperature Oe as one of the oil temperature Oe of the engine oil charged into the engine 11, the oil temperature Om of the working oil charged into the electric motor 13, and the oil temperature Ot of the working oil charged into the torque converter 14.

According to this, the viscosity of the engine oil increases and the torque (viscous torque) acting to reduce the rotation speed Ne of the engine 11 increases in a case where the oil temperature Oe is low and the torque (viscous torque) decreases in a case where the oil temperature Oe is high. Accordingly, by correcting the first torque T1 and the second torque T2 as the post-correction first torque T1d and the post-correction second torque T2d based on the oil temperature Oe as a parameter, it is possible to reduce the rotation speed Ne of the engine 11 for a prompt passage through the vibration amplification region Z in a more reliable manner and it is possible to avoid coincidence between the crank angle θ1 and the top dead center angle θt in the vibration amplification region Z.

The following configuration can be adopted so that the same effect is obtained in the above configuration. In other words, the first torque calculation unit 31 may calculate the first torque T1 corresponding to the rotation speed Ne of the engine 11 by means of the torque map that is illustrated in FIG. 5, in which the absolute value of the first torque T1 increases as the rotation speed of the engine 11 decreases and decreases to zero as the rotation speed becomes zero in a case where the operation state of the engine 11 has shifted to stop.

In addition, as illustrated in FIG. 6 or 8, the first torque correction unit 32 or the second torque correction unit 34 may decide, by using the oil temperature Oe, the correction factors G1 and G2 decreasing in value as the oil temperature Oe of the engine 11 decreases and increasing in value as the oil temperature Oe of the engine 11 increases.

Further, the second torque calculation unit 33 may calculate the second torque T2 such that the absolute value of the second torque T2 increases as illustrated in FIG. 7 as the crank angle θ1 approaches the top dead center angle θt.

First Modification Example

In the above embodiment, the oil temperature Oe of the engine oil charged into the engine 11 is used as a parameter, the first torque correction unit 32 corrects the first torque T1 in calculating the post-correction first torque T1d, and the second torque correction unit 34 corrects the second torque T2 in calculating the post-correction second torque T2d. In a state where the clutch 12 is frictionally engaged, by the way, the motor shaft 13a of the electric motor 13 and the torque converter 14 are directly connected with respect to the crankshaft 11a. Also, the viscosity of the working oil charged into the electric motor 13 and the viscosity of the working oil charged into the torque converter 14 increase at a low temperature and decrease at a high temperature as in the case of the engine oil, and thus it is possible to generate the torque (viscous torque) that acts to reduce the rotation speed Ne of the engine 11, that is, to brake the rotation of the crankshaft 11a.

Accordingly, the oil temperature Om of the working oil of the electric motor 13 or the oil temperature Ot of the working oil of the torque converter 14 can be used as the parameter instead of the oil temperature Oe of the engine oil as illustrated in FIGS. 4, 6, and 8. In this case, the first torque correction unit 32 and the second torque correction unit 34 are capable of calculating the post-correction first torque T1d by correcting the first torque T1 and calculating the post-correction second torque T2d by correcting the second torque T2 as in the embodiment described above by using the oil temperature Om input from the motor oil temperature sensor 25 or the oil temperature Ot input from the torque converter oil temperature sensor 26 as a parameter. Accordingly, also in this case, the same effect as the above embodiment can be obtained.

Second Modification Example

In the above embodiment, the first torque calculation unit 31 and the second torque calculation unit 33 calculate the rotation speed Ne of the engine 11 based on a time change in the crank angle θ1 of the crankshaft 11a and calculate the first torque T1 and the second torque T2. In a state where the clutch 12 is frictionally engaged, by the way, the motor shaft 13a of the electric motor 13 and the torque converter 14 are directly connected with respect to the crankshaft 11a. Accordingly, the crank angle θ1 and the motor rotation angle θ2 of the electric motor 13 and the turbine angle θ3 of the torque converter 14 have one relationship, and thus the crank angle θ1 can be decided by means of the motor rotation angle θ2 or the turbine angle θ3.

Accordingly, the motor rotation angle θ2 or the turbine angle θ3 can be used instead of the crank angle θ1 of the crankshaft 11a as illustrated in FIG. 4. In this case, the first torque correction unit 32 and the second torque correction unit 34 are capable of calculating the rotation speed Ne of the engine 11, the first torque T1, and the second torque T2 as in the embodiment described above by deciding the crank angle θ1 by means of the motor rotation angle θ2 input from the motor rotation angle sensor 22 or the turbine angle θ3 input from the torque converter rotation angle sensor 24. Accordingly, also in this case, the same effect as the above embodiment can be obtained.

Third Modification Example

Figure 13:
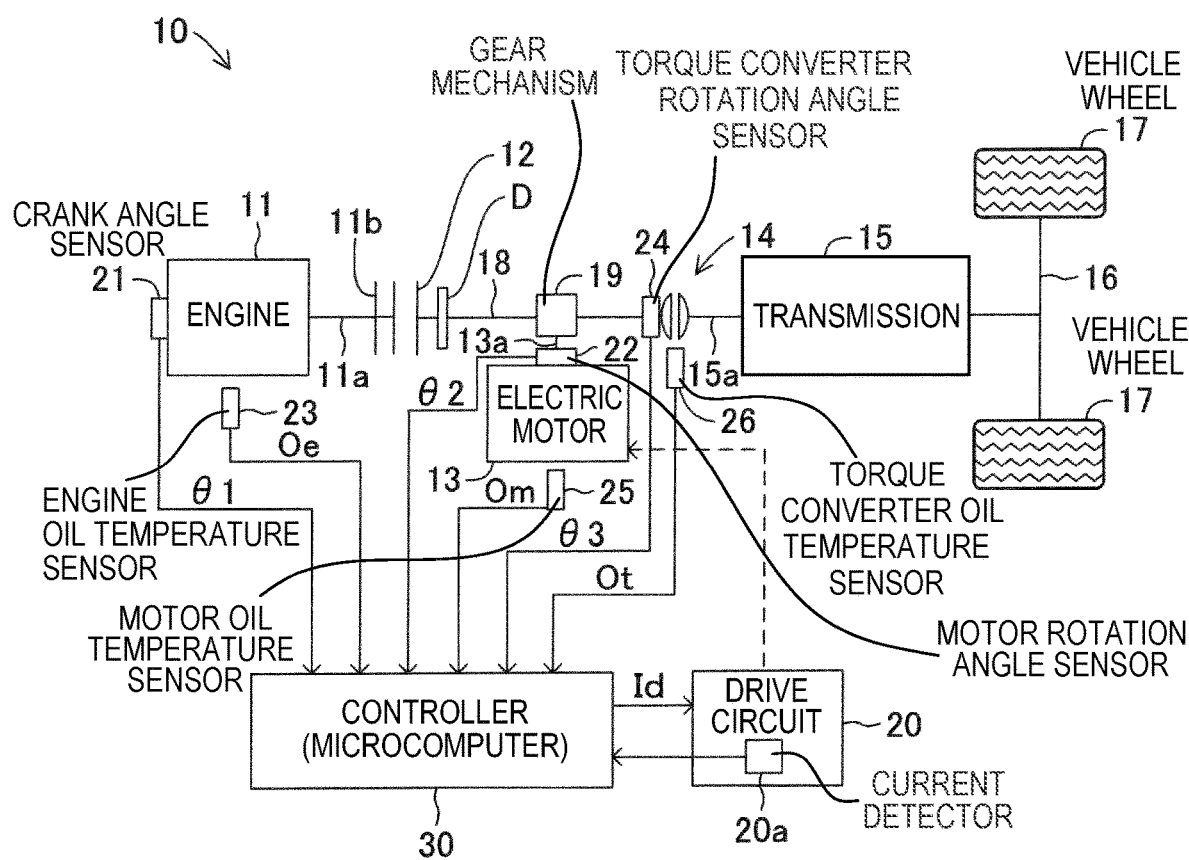
FIG. 13 is a block diagram schematically illustrating the configuration of a vehicle according to a third modification example of the embodiment.

In the above-described embodiment and each of the above-described modification examples, one end of the motor shaft 13a of the electric motor 13 is directly connected to the damper D and the other end is directly connected to the torque converter 14 (such as a pump impeller). As illustrated in FIG. 13, in an alternative configuration, the damper D and the torque converter 14 (pump impeller) can be connected by a shaft 18 and the motor shaft 13a of the electric motor 13 can be connected via a gear mechanism 19 provided integrally with the shaft 18.

As described in the above embodiment, during the damping control executed when the engine 11 is stopped, the electric motor 13 outputs the first torque T1 (negative value) that acts to reduce the rotation speed Ne of the engine 11 and the second torque T2 (negative value) that acts to brake the rotation of the crankshaft 11a such that the crank angle θ1 and the top dead center angle θt do not coincide with each other in the vibration amplification region Z. In other words, when the damping control is executed, the damping control torque Tv decided by addition of the first torque T1 (post-correction first torque T1d) to the second torque T2 (post-correction first torque T1d) has a negative value at all times, and the rotational direction of the motor shaft 13a does not change in a case where the electric motor 13 generates the damping control torque Tv.

Accordingly, even in a case where the electric motor 13 (motor shaft 13a) is connected via the gear mechanism 19 with respect to the shaft 18, it is possible to suppress the generation of an abnormal sound such as a tooth striking sound in the gear mechanism 19 during the execution of the damping control.

The implementation disclosed here is not limited to the above embodiment, and various modifications are possible without departing from the object disclosed here.

For example, in the above-described embodiment and each of the above-described modification examples, the controller 30 controls the electric motor 13 so as to output (transmit) the damping control torque Tv to the crankshaft 11a. It is also possible to perform control such that the clutch 12 is frictionally engaged or the frictional engagement is released (that is, such that connection and disconnection operations are performed) instead of controlling the electric motor 13 as described above. By controlling the connection and disconnection operations of the clutch 12, it is possible to transmit friction-based clutch torque to the crankshaft 11a as the second torque (post-correction second torque) that acts to reduce the rotation speed Ne of the engine 11. Accordingly, also in this case, it is possible to control the rotation of the crankshaft 11a, and it is possible to anticipate the same effects as those of the above-described embodiment and each of the above-described modification examples.

In the above-described embodiment and each of the above-described modification examples, a case has been exemplified where the clutch 12 and the damper D are disposed between the engine 11 and the electric motor 13 as illustrated in FIGS. 1 and 13. However, the embodiments disclosed here are not limited to that disposition, and the following configurations can be used instead. For example, the damper D can be disposed between the engine 11 and the electric motor 13 with the clutch 12 disposed between the electric motor 13 and the transmission 15 (torque converter 14) or the electric motor 13 can be disposed on the side that is opposite to the crankshaft 11a with respect to the engine 11 (left side of the engine 11 in FIGS. 1 and 13) with the clutch 12 and the damper D disposed between the engine 11 and the transmission 15 (torque converter 14).

Also possible is a configuration in which the motor torque of the electric motor 13 is transmitted to the torque converter 14 via the clutch 12 with the clutch 12 and the damper D disposed between the engine 11 and the transmission 15 (torque converter 14) and the electric motor 13 disposed at an intermediate position between the clutch 12 and the damper D. Also possible is a structure in which the electric motor 13 is connected to the engine 11 via a shaft different from the crankshaft 11a with the clutch 12 and the damper D disposed between the engine 11 and the transmission 15 (torque converter 14). Also possible is a structure in which the electric motor 13 is connected to the input shaft 15a of the transmission 15 with the clutch 12 and the damper D disposed between the engine 11 and the transmission 15 (torque converter 14).

In the above embodiment, the transmission 15 mounted in the vehicle 10 is a stepped transmission and an automatic transmission (AT) that has the torque converter 14. Alternatively, the transmission 15 can be a manual transmission (MT) or an automated manual transmission (AMT or the like) as a stepped transmission that does not have the torque converter 14 or a continuously variable transmission (CVT or the like).

In the above-described embodiment and each of the above-described modification examples, the controller 30 calculates (acquires) desired values by referring to various maps set in advance as illustrated in FIGS. 5 to 9. Alternatively, the controller 30 is capable of directly calculating desired values by using preset functions representing the relationships illustrated in the maps of FIGS. 5 to 9.

A vehicle controller according to an aspect of this disclosure is applied to a vehicle having an engine, a transmission, a clutch connecting and disconnecting a crankshaft of the engine and an input shaft of the transmission to each other, a vehicle wheel connected to a drive axle of the transmission, and an electric motor disposed so as to be capable of transmitting torque to at least the crankshaft and controls driving of the electric motor such that a rotation speed of the engine is reduced when an operation state of the engine shifts from operation to stop. The vehicle controller is configured to control rotation of the crankshaft such that a crank angle as a rotation angle of the crankshaft does not coincide with a top dead center angle as a rotation angle corresponding to a top dead center of the engine in a vibration amplification region amplifying an amplitude of vibration generated when the operation state of the engine shifts to the stop.

According to this configuration, the controller is capable of controlling the rotation of the crankshaft such that the crank angle of the crankshaft does not coincide with the top dead center angle corresponding to the top dead center of the engine in the vibration amplification region. Accordingly, the vibration of the engine can be suppressed in the vibration amplification region, and a satisfactory damping effect can be obtained.

The vehicle controller according to the aspect of this disclosure may be configured such that the vehicle controller further includes a first torque calculation unit configured to calculate a first torque reducing the rotation speed of the engine, a first torque correction unit configured to calculate a post-correction first torque by correcting the first torque based on a parameter related to reducing the rotation speed of the engine such that the first torque is smaller in a case where the parameter contributes to reducing the rotation speed of the engine than in a case where the parameter does not contribute to the reduction, a second torque calculation unit configured to calculate a second torque delaying a timing at which the crank angle coincides with the top dead center angle, a second torque correction unit configured to calculate a post-correction second torque by correcting the second torque based on the parameter such that the second torque is smaller in a case where the parameter contributes to delaying coincidence between the crank angle and the top dead center angle than in a case where the parameter does not delay the coincidence, a command torque calculation unit configured to calculate a damping control torque command for damping vibration generated in the engine when the operation state of the engine shifts to the stop by adding the post-correction first torque to the post-correction second torque, and a drive control portion configured to perform drive control on the electric motor based on the damping control torque command and generating a damping control torque such that the damping control torque is transmitted to the engine via the crankshaft.

The vehicle controller according to the aspect of this disclosure may be configured such that the second torque calculation unit calculates the second torque such that the second torque increases as a difference between the crank angle and the top dead center angle decreases and the second torque decreases as the difference increases.

The vehicle controller according to the aspect of this disclosure may be configured such that the transmission is connected to the engine and the electric motor via a torque converter provided on the input shaft, and the parameter is one of an oil temperature of engine oil charged into the engine, an oil temperature of working oil charged into the electric motor, and an oil temperature of working oil charged into the torque converter.

The vehicle controller according to the aspect of this disclosure may be configured such that the crank angle is decided based on a rotation angle of the electric motor or a rotation angle of the torque converter.

The vehicle controller according to the aspect of this disclosure may be configured such that the first torque calculation unit calculates the first torque corresponding to the rotation speed of the engine based on a torque map in which an absolute value of the first torque increases as the rotation speed of the engine decreases and the absolute value of the first torque decreases to zero as the rotation speed becomes zero in a case where the operation state of the engine has shifted to stop.

The vehicle controller according to the aspect of this disclosure may be configured such that the first torque correction unit or the second torque correction unit decides a correction factor that decreases in value as an oil temperature of the engine decreases and increases in value as the oil temperature of the engine increases using an oil temperature.

The vehicle controller according to the aspect of this disclosure may be configured such that the second torque calculation unit calculates the second torque such that an absolute value of the second torque increases as the crank angle approaches the top dead center angle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle controller applied to a vehicle including an engine, a transmission, a clutch connecting and disconnecting a crankshaft of the engine and an input shaft of the transmission to each other, a vehicle wheel connected to a drive axle of the transmission, and an electric motor transmitting torque to at least the crankshaft, and controlling driving of the electric motor such that a rotation speed of the engine is reduced when an operation state of the engine shifts from operation to stop, the vehicle controller being configured to control rotation of the crankshaft so as to avoid coincidence between a crank angle as a rotation angle of the crankshaft and a top dead center angle as a rotation angle corresponding to a top dead center of the engine in a vibration amplification region amplifying an amplitude of vibration generated when the operation state of the engine shifts to the stop, the vehicle controller comprising:
a first torque calculation unit configured to calculate a first torque reducing the rotation speed of the engine;
a first torque correction unit configured to calculate a post-correction first torque by correcting the first torque based on a parameter related to reducing the rotation speed of the engine such that the first torque is smaller in a case where the parameter contributes to reducing the rotation speed of the engine than in a case where the parameter does not contribute to the reduction;
a second torque calculation unit configured to calculate a second torque delaying a timing at which the crank angle coincides with the top dead center angle;
a second torque correction unit configured to calculate a post-correction second torque by correcting the second torque based on the parameter such that the second torque is smaller in a case where the parameter contributes to delaying coincidence between the crank angle and the top dead center angle than in a case where the parameter does not delay the coincidence;
a command torque calculation unit configured to calculate a damping control torque command for damping vibration generated in the engine when the operation state of the engine shifts to the stop by adding the post-correction first torque to the post-correction second torque; and a drive control portion configured to perform drive control on the electric motor based on the damping control torque command and generating a damping control torque such that the damping control torque is transmitted to the engine via the crankshaft.

2. The vehicle controller according to claim 1, wherein the second torque calculation unit calculates the second torque such that the second torque increases as a difference between the crank angle and the top dead center angle decreases and the second torque decreases as the difference increases.

3. The vehicle controller according to claim 1, wherein the transmission is connected to the engine and the electric motor via a torque converter provided on the input shaft, and the parameter is one of an oil temperature of engine oil charged into the engine, an oil temperature of working oil charged into the electric motor, and an oil temperature of working oil charged into the torque converter.

4. The vehicle controller according to claim 3, wherein the crank angle is decided based on a rotation angle of the electric motor or a rotation angle of the torque converter.

5. The vehicle controller according to claim 1, wherein the first torque calculation unit calculates the first torque corresponding to the rotation speed of the engine based on a torque map in which an absolute value of the first torque increases as the rotation speed of the engine decreases and the absolute value of the first torque decreases to zero as the rotation speed becomes zero in a case where the operation state of the engine has shifted to stop.

6. The vehicle controller according to claim 1, wherein the first torque correction unit or the second torque correction unit decides a correction factor that decreases in value as an oil temperature of the engine decreases and increases in value as the oil temperature of the engine increases.

7. The vehicle controller according to claim 1, wherein the second torque calculation unit calculates the second torque such that an absolute value of the second torque increases as the crank angle approaches the top dead center angle.

\* \* \* \* \*